US011303649B2

(12) United States Patent
Hatfield et al.

(10) Patent No.: US 11,303,649 B2
(45) Date of Patent: Apr. 12, 2022

(54) MAINTAINING ELECTRONIC COMMUNICATIONS SESSION CONTINUITY DURING SESSION INACTIVITY

(71) Applicant: International Business Machines Corporation, Armonk, NY (US)

(72) Inventors: Jennifer M. Hatfield, San Francisco, CA (US); Michael Bender, Southbury, CT (US); Todd P. Seager, Lehi, UT (US); Jeremy R. Fox, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 16/426,636

(22) Filed: May 30, 2019

(65) Prior Publication Data
US 2020/0382520 A1 Dec. 3, 2020

(51) Int. Cl.
G06F 9/451 (2018.01)
H04L 29/06 (2006.01)
G06N 20/00 (2019.01)

(52) U.S. Cl.
CPC ............ H04L 63/108 (2013.01); G06F 9/451 (2018.02); G06N 20/00 (2019.01); H04L 63/08 (2013.01)

(58) Field of Classification Search
CPC ....... H04L 63/108; H04L 63/08; G06N 20/00; G06F 9/451
See application file for complete search history.

(56) References Cited

U.S. PATENT DOCUMENTS

| 6,993,596 | B2 | 1/2006 | Hinton et al. |
| 7,069,444 | B2 | 6/2006 | Lowensohn et al. |
| 7,093,020 | B1 | 8/2006 | McCarty et al. |
| 2004/0128546 | A1 | 7/2004 | Blakley, III et al. |
| 2006/0009981 | A1* | 1/2006 | Engstrom ............. G06F 1/3231 704/270 |
| 2006/0059556 | A1 | 3/2006 | Royer |

(Continued)

OTHER PUBLICATIONS

Disclosed Anonymously, "Method and System for Keeping an Application Session Alive Based on a Configured Set of Rules", IPCOM000216458D, Apr. 9, 2012, IP.com.

(Continued)

Primary Examiner — Anil K Bhargava
(74) Attorney, Agent, or Firm — Heslin Rothenberg Farley & Mesiti P.C.; Gail Zarick, Esq.

(57) ABSTRACT

A method, computer program product, and a system where a processor(s) determine that a user of a given computing device has been authenticated to initiate an application session, that the application session is open, and that the application session has a timeout mechanism triggered by inactivity (i.e., the session not receiving a selection within a first predefined period of time). The processor(s) determines that the application session will automatically timeout within a second predefined period of time based on the inactivity. The processor(s) monitors activities of the user during pendency of the application session with the application including physical and computing activities of the user. The processor(s) determines that at least one activity of the activities indicates engagement of the user with the application session. The processor(s) prevent the timeout mechanism from being triggered during a duration of the at least one activity.

18 Claims, 5 Drawing Sheets

(56) References Cited

U.S. PATENT DOCUMENTS

2010/0306392 A1* 12/2010 Fell, Jr. .................. H04L 67/14
709/228
2012/0137213 A1    5/2012 Hayler et al.
2018/0288162 A1* 10/2018 Figueroa ............... H04L 67/025
2019/0037036 A1    1/2019 Sunkara et al.
2020/0225799 A1*  7/2020 Marra .................. G06F 3/0416

OTHER PUBLICATIONS

P. Mell, et al. "The NIST Definition of Cloud Computing", NIST Special Publication 800-145, Sep. 2011, Gaithersburg, MD.
IBM, "Customizing the Timeout Warning in an Application" https://www.ibm.com/support/knowledgecenter/en/SS8S5A_7.0.4/com.ibm.curam.content.doc/WebClientReference/t_WEBCREF_sessiontimer_custapp.html.

* cited by examiner

MAINTAINING ELECTRONIC COMMUNICATIONS SESSION CONTINUITY DURING SESSION INACTIVITY

BACKGROUND

As data security concerns rise, authentication to various websites, applications, and/or web services where sensitive and/or financial transactions are undertaken by users has become more elaborate. Rather than only utilize a password verification, many user interfaces to services provided over the Internet require multiple factor authentication, which can include two factor authentication (e.g., confirming a user's claimed identity by utilizing something the user knows, such as a password, and a second factor other than something the user has or something the user is), and even, three factor authentication (e.g., confirming a user's claimed identity by utilizing something the user knows, such as a password, something the user has, such as a smart card, and something the user is, such as a fingerprint or other biometric method). Although these more elaborate authentication methods improve data security, they are also more time consuming for the user and it is in the best interest of the user to stay in an authenticated session while the user is utilizing the website, application, and/or web service.

SUMMARY

Shortcomings of the prior art are overcome and additional advantages are provided through the provision of a method for maintaining session continuity during inactivity. The method includes, for instance: determining, by one or more processors, that a user of a given computing device has been authenticated to initiate an application session, that the application session is open, and that the application session has a timeout mechanism triggered by inactivity, wherein the inactivity comprises the session not receiving a selection, via the given computing device, within a first predefined period of time, through an application session interface, wherein the application session interface is rendered by the given computing device in a graphical user interface of the given computing device; determining, by the one or more processors, based on the timeout mechanism, that the application session will automatically timeout within a second predefined period of time based on the inactivity; monitoring, by the one or more processors, activities of the user during pendency of the application session with the application, wherein the activities comprise physical activities of the user and computing activities of the user; based on the monitoring, determining, by the one or more processors, that at least one activity of the activities indicates engagement of the user with the application session; and based on identifying the at least one activity indicating the engagement, preventing, by the one or more processors, the timeout mechanism from being triggered during a duration of the at least one activity.

Shortcomings of the prior art are overcome and additional advantages are provided through the provision of a computer program product for maintaining session continuity during inactivity. The computer program product comprises a storage medium readable by a processing circuit and storing instructions for execution by the processing circuit for performing a method. The method includes, for instance: determining, by the one or more processors, that a user of a given computing device has been authenticated to initiate an application session, that the application session is open, and that the application session has a timeout mechanism triggered by inactivity, wherein the inactivity comprises the session not receiving a selection, via the given computing device, within a first predefined period of time, through an application session interface, wherein the application session interface is rendered by the given computing device in a graphical user interface of the given computing device; determining, by the one or more processors, based on the timeout mechanism, that the application session will automatically timeout within a second predefined period of time based on the inactivity; monitoring, by the one or more processors, activities of the user during pendency of the application session with the application, wherein the activities comprise physical activities of the user and computing activities of the user; based on the monitoring, determining, by the one or more processors, that at least one activity of the activities indicates engagement of the user with the application session; and based on identifying the at least one activity indicating the engagement, preventing, by the one or more processors, the timeout mechanism from being triggered during a duration of the at least one activity.

Methods and systems relating to one or more aspects are also described and claimed herein. Further, services relating to one or more aspects are also described and can be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
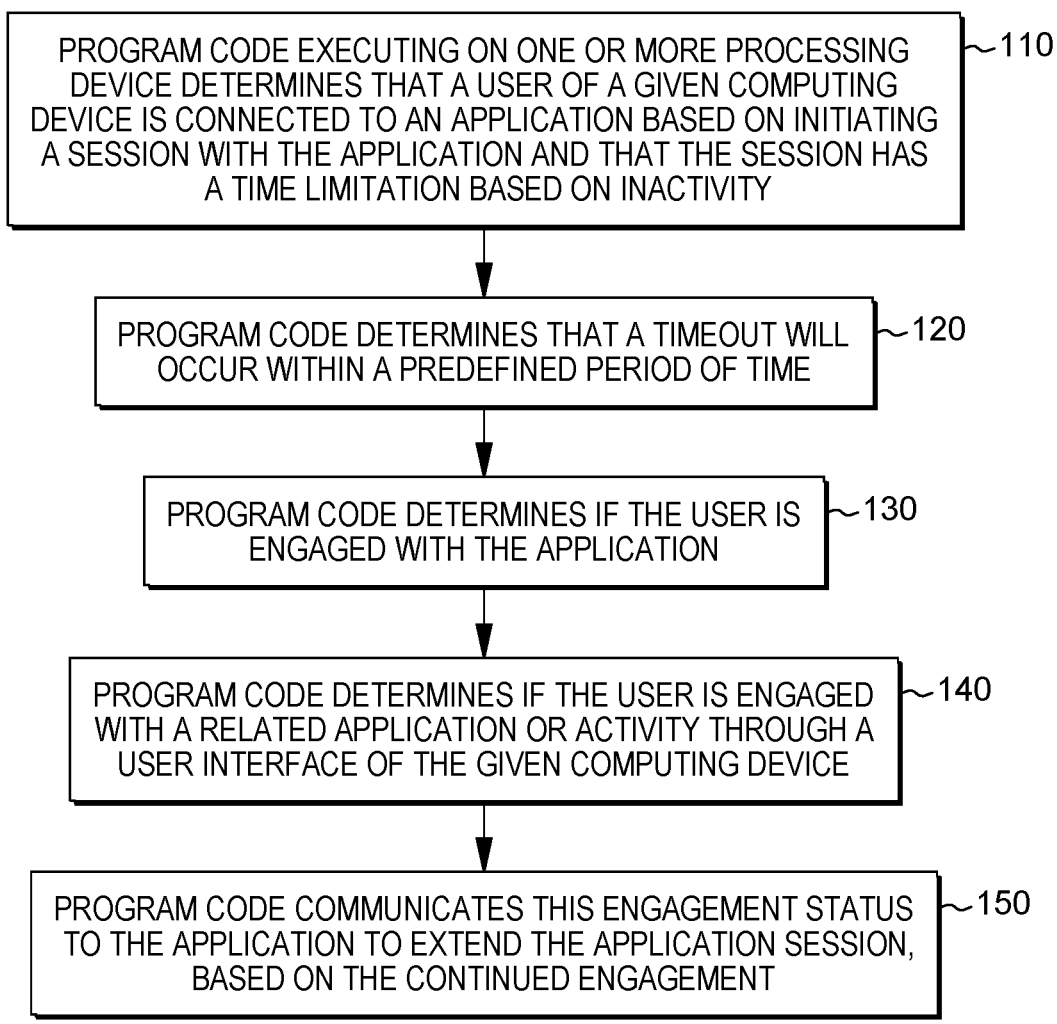
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
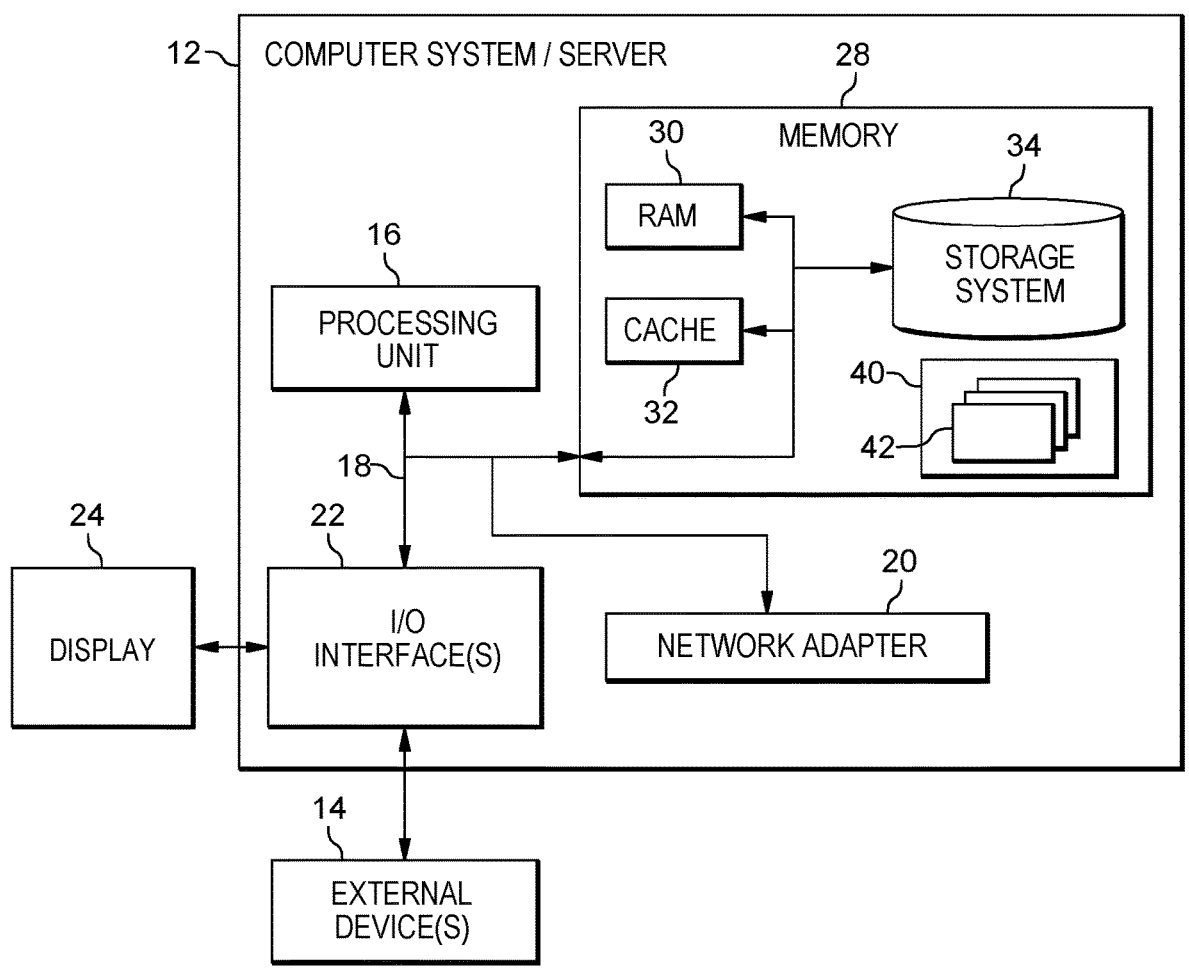
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, can be stored in memory 28.

As discussed above, authenticating to a user interface to access, for example, a website, an application, and/or web services, can be a time consuming and involved process. Another security measure of the user interfaces is that the user is automatically logged out (sometimes with a warning), when the user does not take action on an input/output device of a computing device that the user is utilizing for an interface to the website, an application, and/or web services. For example, in some cases if a user does not make any inputs through a keyboard, mouse, and/or touchscreen, and/or move the input/output device, for a given period of time, the user is automatically logged out (sometimes with a warning) of the interface to the website, an application, and/or web services. For brevity, the term application will be used herein to refer to any process, program, interface, service, website, etc., that a user is authenticated to access utilizing a computing device. When the user is logged out of the application prematurely, the user must take the time to reconnect and the more complex the authentication, the less efficient the transaction/interaction with the application. Rather than logging a user off from an application accessed from a computing device based solely on activities performed by the user utilizing the computing device, in embodiments of the present invention, program code executing on one or more processors links various user activities to the duration of authenticated sessions in order to accurately extend and/or terminate online sessions based on a more accurate understanding of whether the user is engaged with the application to which the user was previously authenticated.

Embodiments of the present invention include a computer-implemented method, a computer program product, and a computer system where program code executing on at least one processing device: 1) extends an online user session for an application by linking duration of the online user session to user behaviors indicative of continued engagement with the online user session, in addition to, or instead of, on a period lapsing without the user utilizing an input/output (I/O) device communicatively coupled to the interface, through which the user accesses the user session; and 2) terminates the online user session based on detecting user behaviors indicating a lack of engagement with the online user session. In some embodiments of the present invention, the program code identifies user behaviors indicative of continued engagement with the online user session based on performing one or more of the following: 1) utilizing an Internet of Things (IoT) device registered to the user, with the permission of the user, to track user behavior; 2) utilizing various devices proximate to the user, including devices embedded in a computing device the user utilizes to access the application, to monitor, with the user's permission, the user's engagement with the online user session, by monitoring one or more of the user's eye movement, speech, and/or physical activity; and/or 3) identifying applications being utilized by the user while not interacting with the application and determining that the interactions with the identified applications are relevant to the engagement of the user with the online user session.

Embodiments of the present invention are inextricably linked to computing because aspects of these embodiments address issues particular to computing by utilizing computing technology. Electronic authentication of users and security enforcement on applications that authenticate users are both aspects that are particular to computing. Embodiments of the present invention utilize various computing devices and technologies to extend and close windows in which users are authorized to utilize these applications in a manner that reflects, more accurately, the interaction of the users with these applications. Thus, embodiments of the present invention are inextricably linked to computing based on addressing an issue unique to computing (i.e., premature expiration of application sessions) with an approach grounded in computing (i.e., utilizing IoT devices, motion sensors, and/or user interaction with additional applications).

Embodiments of the present invention provide a practical approach to a defined issue. The issue, as expressed above, is an inaccurate (e.g., premature) automatic session expiration for a user who is still engaged with the session, but not necessarily by making inputs into an I/O device or moving an I/O device communicatively coupled to the physical machine that the user utilized to initiate the session. Embodiments of the present invention contain aspects that provide a practical solution to this specific issue, recognizing activities relevant to the session, but not within the predefined limits. As explained below, in embodiments of the present invention, the program code can extend application sessions based on one or more of the following: user behavior, user physical activity, user computing activity, and/or user physical orientation. Thus, embodiments of the present invention integrate into a practical application an approach to extending application sessions.

Embodiments of the present invention include aspects that represent significant improvements to existing approaches of application session management. For example, some existing approaches modify a timeout of a given application based on tracking historical activity of individuals with the given application. These approaches require significant historical data to inform a logout decision and is limited to the interactions of the user with the application. However, in some embodiments of the present invention, program code executing on at least one computing device extends session times, which includes modifying timeouts, and avoiding premature timeouts, in real-time, rather than relying on historical data collection. For example, in some embodiments of the present invention, the program code can extend a session and avoid an inaccurate timeout based on one or more of: obtaining data from IoT devices to determine if a user is engaged with the session, utilizing image, audio, activity and/or movement analysis to determine if an individual is focused on a session. Additionally, embodiments of the present invention can utilize historical data beyond the user interactions of the user that are specific to the application in order to determine whether a user is engaged with the application.

FIG. 1 is a workflow 100 that depicts various aspects of some embodiments of the present invention. In some embodiments of the present invention, program code executing on one or more processing device determines that a user of a given computing device is connected to an application based on initiating a session with the application and that the session has a time limitation that is based on inactivity (110). In some embodiments of the present invention, the program code determines that a timeout will occur within a predefined period of time (120). The predefined period of time can be a set amount of time before an automatic timeout, in order to allow time for the program code to check whether the user is engaged with the session in a manner outside of making inputs into an I/O device communicatively coupled to the computing device. The program code can check for engagement each time a session clock is at a certain point before a timeout. In some embodiments of the present invention, regardless of the timing of the clock, the program code can continuously check for user engagement at consistent intervals.

Returning to FIG. 1, in some embodiments of the present invention, the program code determines if the user is engaged with the application (130). The program code can determine that the user is engaged based on monitoring the user utilizing one or more IoT devices registered to the user and/or utilizing various devices integrated with the given computing device. In some embodiments of the present invention, the user can provide permission to the program code to access the IoT device(s) and/or the devices of the computing device for the purpose of session management. The user can actively register the IoT device(s) to provide permission and ascent to use of the integrated devices. Thus, any monitoring of the user performed by the program code is performed with the permission of the user and for the purpose of session management.

As discussed above, in some embodiments of the present invention, the program code determines if a user is engaged with an application (130) based on obtaining supplemental information from one or more IoT devices registered by the user. The program code can obtain the supplemental information contemporaneously with the application session. In embodiments of the present invention, the program code can determine if a user is engaged with an application based on utilizing IoT devices associated with the user to capture and assess the activity of the user, and, if available, based on data obtained by the program code from various IoT devices within physical proximity to the user, as the user utilizes the computing device. In some embodiments of the present invention, the computing device utilized to initiate and maintain the application session and the IoT device are the same physical device.

As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object or an area, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor can identify the source of the information. Although in some embodiments of the present invention, users actively register IoT devices for utilization by the program code, in some embodiments of the present invention, the program code could automatically discover possible IoT devices and request confirmation from the user. Within the IoT, various devices can communicate with each other and can access data from sources available over various communication networks, including the Internet. Certain IoT devices can also be placed at various locations and can provide data based in monitoring environmental factors at the locations.

In embodiments of the present invention, the program code utilizes one or more IoT devices to determine if a user is performing an activity that indicates that the user is engaged with the application. If the program code determines that the user is engaged, the program code extends the application session and/or otherwise prevents the session from timing out. IoT devices can monitor and capture user activity through the collection of a wide range of data. IoT devices can collect video, image, movement, and audio data, all of which can assist the program code in determining whether the user is engaged with a given application. In various embodiments of the present invention, program code can determine that users are engaged with a session based on determining, during the pendency of the session, one or more of the following: 1) the user is visually focused on the session; 2) the user is engaging a behavior that indicates engagement with the session; and/or 3) the user is engaged in conversations that are relevant to the session.

In some embodiments of the present invention, the program code determines that a user is engaged with a session based on the user visually focusing on the application instance, as displayed on the computing device (e.g., as a graphical user interface). To make this determination, the program code utilizes an IoT device to capture an image and/or video of the user, from which the program code can determine that the user's eye positioning and/or movements indicate that the user is focused on the instance. In order to determine if a user is visually engaged with the instance, one or more programs receive data from the image capture device (e.g., a camera integrated into a computer monitor of the computing device, an IoT device proximate to the user) indicating the eye movements and/or positioning of the user when observing the computer monitor of the computing device. The one or more programs can compute a current focal point of the user (based on the observed eye movements relative to the computer monitor), to determine whether the user is focused on the instance.

In some embodiments of the present invention, the program code determines that a user is engaged with a session based on the user engaging in a physical activity that was a past indicator of engagement with an application. Based on monitoring a user's movements, the program code can learn when a user is engaged with a session. For example, a given user can perform a specific physical activity and if a session times out while the user is engaged in this activity and the user quickly reconnects, the program code can conclude, with a given degree of certainty based on the repetitiveness of this behavior, that the user remains engaged when performing this specific activity and therefore, the program code should extend the session. As one non-limiting example, the program code can determine that a user remains engaged when the user is tapping the user's fingers, despite not making any inputs through as I/O device. In another example, a given user can utilize a banking application with a security timeout and while using that application, the individual balances a physical checkbook by looking down at small pieces of paper when balancing the checkbook. This given user is not focused on the session with the banking application, but is engaged in behavior that is relevant to the session. Thus, the program code can learn that the session should remain connected despite the fact that the user is not focused on the interface for (potentially) long periods of time and seemingly idle as far as making inputs. Similarly, the program code can determine that walking away from the user interface of the computing device and/or surfing media websites indicate a lack of engagement by the user and will not extend the session should the user engage in these behaviors.

Figure 2:
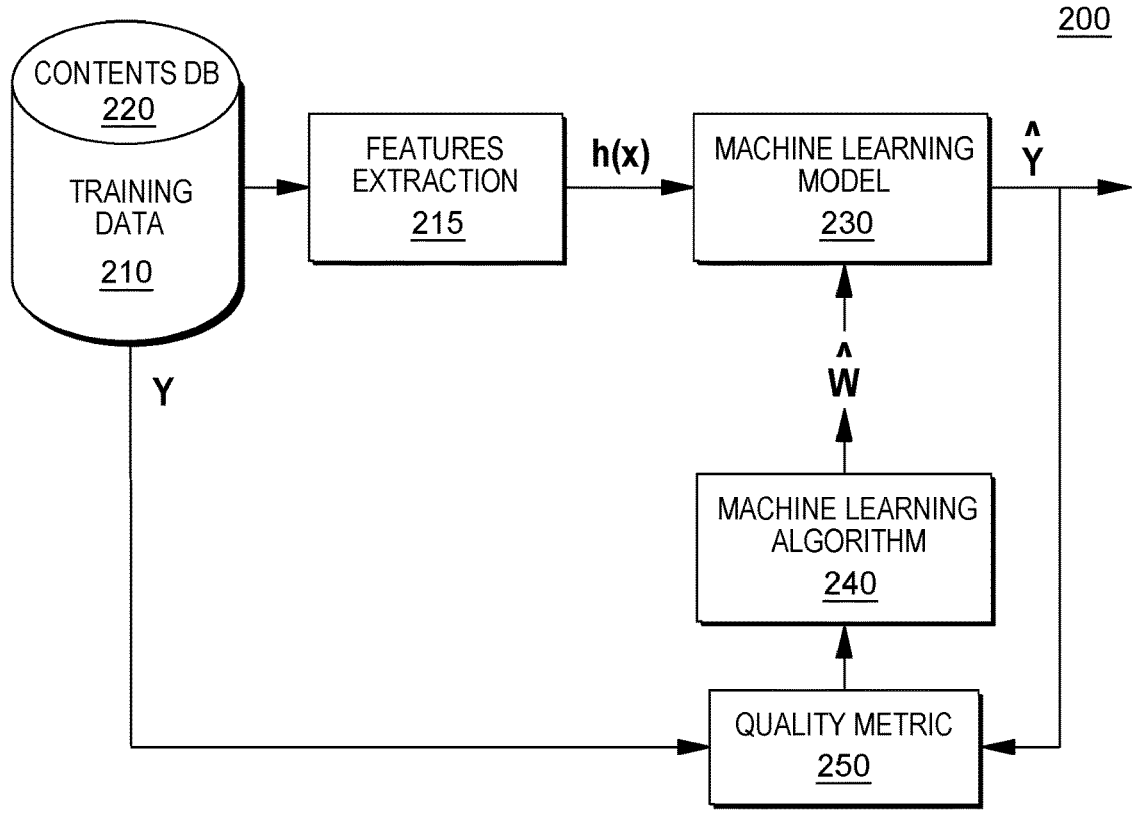
FIG. 2 illustrates various aspects of some embodiments of the present invention.

In some embodiments of the present invention, the program code monitors the user and by utilizing data collected by available (registered) IoT devices, and can apply machine learning algorithms to model the user's activity patterns and to generate a user activity profile. The program code can train these algorithms, based on patterns for the user (or across all user). FIG. 2 is an example of a machine learning training system 200 that can be utilized to perform cognitive analyses of sensor and IoT data to generate a user activity profile in embodiments of the present invention. Program code can obtain data in embodiments of the present invention from one or more personal devices (e.g., IoT devices, sensors, personal health trackers, physical activity trackers, smart watches, etc.), which the user can be utilizing while a session is active on a computing device. Program code in an embodiment of the present invention can obtain data from these personal devices indicating that the driver is engaged with the session. For example, a personal device worn by the user can include an accelerometer and/or a gyroscope. The program code can utilize these motion sensing devices to identify physical activities that indicate an engagement with the session.

In some embodiments of the present invention, the program can generate an activity or movement profile for a given user. The profile includes machine learned activity and/or movement patterns for the given user, based on the monitoring. The profile includes an engagement measure indicating a probability of a given pattern indicating the engagement. For example, based on monitoring a user over time, program code determines that the user will re-initiate a session that times out when the user is pacing proximate to the computing device utilized by the user. Thus, moving forward, the program code can predict that if the user is pacing, the user is engaged with the session and therefore, the program code can prevent the session from timing out when the user is pacing. In another example, the program code can identify a movement which the user performs is answering a phone call while engaged with the session. The program code determines, based on observing this behavior repeatedly, that the user returns to the session only, for example, fifty percent of the time, after answering a phone call. Thus, moving forward, the program code determines that it cannot predict, with reasonable reliability, whether the user answering the phone indicates that the session should be extended. Thus, the program code, in this example, does not extend a session and/or prevent a timeout, when a user answers a phone call during the pendency. In some embodiments of the present invention, the program code extends the session for a given movement provided that this movement is indicative of desired session continuity above a given threshold percentage.

Machine learning (ML) solves problems that cannot be solved by numerical means alone. In this ML-based example, program code extracts various features/attributes from training data 240, which can be resident in one or more databases 220 comprising IoT data (e.g., sensor data). In some embodiments of the present invention, the training data 240 can comprise historical activity data of the user. The features are utilized to develop a predictor function, h(x), also referred to as a hypothesis, which the program code utilizes as a machine learning model 230. In identifying various features/attributes (e.g., patterns) in the training data 240, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code can utilize a machine learning algorithm 240 to train the machine learning model 230 (e.g., the algorithms utilized by the program code), including providing weights for the conclusions, so that the program code can prioritize various activities based on the consistency and speed at which a user re-initiates a lost connection when engagement in this activity precedes a timeout, in accordance with the predictor functions that comprise the machine learning model 230. The conclusions can be evaluated by a quality metric 250. By selecting a diverse set of training data 210, the program code trains the machine learning model 230 to identify and weight various attributes (e.g., features, patterns) that correlate to various physical activities. Based on modeling the user's behavior and physical activity while utilizing applications on a computing devices, the program code can determine whether temporal sensor data represents an established pattern, indicating that the user is engaged with the session while performing certain physical activities.

In some embodiments of the present invention, the program code determines that the user is engaged in the session based on determining that the user is engaged in conversations that are relevant to the session, during the pendency of the session. The program code can determine that a user is engaged with a session based on the program code cognitively analyzing audio data captured by an IoT device and/or a capture device on the computing device and concluding that the context of the audio is relevant to the application. For example, a user can initiate a session with an application to retrieve electronic tickets to an event, but can be required to stand on a line to wait for the tickets, now rendered on the screen of the computing device, to be scanned. Based on the wait, the session could timeout and the user could have to log in again. However, based on capturing ambient conversation during this wait, the program code can determine that the user is engaged in a conversation about the tickets and about entering the event and extend the session based on the conversation remaining ongoing being relevant to the application. The program code can terminate the session and/or populate a timeout warning to the user based on the relevant conversation having ceased for a predetermined period of time (e.g., one minute, five minutes, twenty minutes, etc.).

To determine that a user is engaged in a conversation that is relevant to an application session and/or that ambient conversation is relevant to the application, the program code obtains audio data from one or more IoT devices and cognitively analyzes the audio to determine if the context is relevant to the application session. In order to analyze the audio data, the program code can utilize APIs that process the audio. The various APIs can include, but are not limited to, a tone analyzer API, a personality insight API, a text to speech API, and a translation API. In some embodiments of the present invention, the program code compares context derived from NLP processing of a conversation contemporaneous with an application session and the context on application session (e.g., a screen of the application) and determines if the contexts are related.

In some embodiments of the present invention, the program code can utilize an existing cognitive agent to determine the subject of a conversation (or isolated communication), determined the subject(s) of the conversation/communication, and determine whether the subject(s) is relevant to a pending application session. One such cognitive agent that can be utilized in embodiments of the present invention is IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to identify a subject and/or context of an oral communication. For example, three APIs that can be utilized in embodiments of the present invention include, but are not limited to IBM Watson® Natural Language Classifier (NLC), IBM Watson® Natural Language Understanding, and IBM Watson® Tone Analyzer. As understood by one of skill in the art, the IBM Watson® APIs are only provided to offer an example of possible APIs that can be integrated into embodiments of the present invention and to illustrate the functionality of the program code in embodiments of the present invention, whether through integration of an existing cognitive engine or not.

In some embodiments of the present invention, the cognitive natural language processing (NLP) capabilities of the program code are implemented as a machine learning system that includes a neural network (NN). In certain embodiments of the present invention the program code utilizes supervised, semi-supervised, or unsupervised deep learning through a single- or multi-layer NN to correlate various attributes from unstructured and structured data related to a user (e.g., gathered by the program code from IoT devices) with the application session. The program code utilizes resources of the NN to identify and weight connections from the attribute sets in the audio to determine the context of the conversation(s) and whether the conversation(s) are relevant to the application session. For example, the NN can identify certain keywords that indicate a relevant to the application. If the application session is with a ticketing application and the conversation is about tickets, the program code would determine that the conversation is relevant to session.

As understood by one of skill in the art, neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situation where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing (NLP). Thus, by utilizing an NN the program code can identify attributes and classify these attributes as relevant to a various applications.

Returning to FIG. 1, the program code determines if the user is engaged with a related application or activity through a user interface of the given computing device (140). In some embodiments of the present invention, a user accesses the initial application, via a website, and the program code determines if the user is engaged one or more applications on one or more related websites. To make this determination, in some embodiments of the present invention, the program code monitors other applications (e.g., websites) that a user is engaged with on the given computing device, during the session with the application and determines if the other applications are related to the pending application session, based on determining if there is a linkage between the other applications and the application session. In some embodiments of the present invention, the user establishes linkages between applications or websites in advance of initiating the session. Thus, the program code can determine that although the user is interacting with a different application, the activities of the user are still related to the session and the program code can extend the session and/or prevent the session from expiring from lack of user interaction. In some embodiments of the present invention, when a user has initiated a given session but instead of working in that session, the user is utilizing a different application on the computing device, the program code can provide a warning to the user, in advance of the session timeout, that the session is timing out and request that the user confirm or deny that the different application is linked to the session. If the user confirms that the different application is linked to the session, the program code will retain this information, and should the user work in this application while a session of the initial application is open, the program code will extend the session while the user is working in the different application, as if the user were still active within the session. Thus, the program code tracks secondary applications and websites that are relevant to a given application, such that the program code can continue sessions in the given application when a user is utilizing these secondary applications and websites. In some embodiments of the present invention, linkages of sites and applications are not user-specific and provided another user has linked sites or applications, the program code either automatically extends the session beyond what would be the expiration, keeping the session engaged and/or prompting the user the agree to confirm that the session should remain active. In the latter circumstance, if the user confirms that the session should remain active, the program code keeps the session active despite the lack of activity of the user within the session itself. In some embodiments of the present invention, if the user is utilizing another application that was linked to the initial application by another user, the program code can prompt the user to see if the user regards the applications as linked and provide in the prompt that the linkage was supplied by another user.

A non-limiting example of when the program code determines if the user is engaged with a related application or activity through a user interface of the given computing device (140) is when a given user initiates a banking application through a graphical user interface (GUI) on a computing device. The application authenticates the user and a session is initiated. While keeping a window with the session open on a computing device, rather than interact with the device, the user launches additional applications in new windows and utilizes these additional applications to review financial data, including banking balances and transactions. The program code in some embodiments of the present invention monitors the activity of the user on the given computing device and before expiration of the session (based on inactivity), the program code determines whether one or more of the additional applications in new windows are linked to the banking application. If the program code determines that a linkage exists, the program code keeps the session active. If there is no predefined linkage, the program code can warn the user that the session is about to expire and request of the user whether there is a linkage between the session and any of the one or more of the additional applications. Should the user indicate a linkage, the program code will not timeout the session if the user is interacting with the linked application and the program code will retain the linkage for future use. In this example, because the additional applications that the user is utilizing are being used to review financial data, including banking balances and transactions, the program will likely either determine that a linkage exists, initially, or the user will indicate that there is a linkage, in response to the timeout warning, and the program code will therefore be able to identify the linkage in the future. As discussed above, the program code can identify a linkage based on linkages established by the user and/or linkages established by users of the shared computing environment.

In some embodiments of the present invention, rather than rely on registration of linkages between applications to establish a linkage, the program code performs a cognitive analysis of established linkages to predict additional linkages. The program code can automatically implement these predicted linkages to extend sessions of applications and/or prompt the user regarding whether to extend the session of an application is a linkage is predicted. In some embodiments of the present invention, linkages that are provided by users (as described above) can become training data, such that the program code can upload, track, correlate, and analyze applications and predict relationships between the applications, by performing a cognitive analysis. Cognitive analysis and machine learning is described above as related to user activities, but the same cognitive analytics facilities, including but not limited to the capabilities of IBM® Watson, can be utilized by the program code to provide recommendations for application linkages future users. In embodiments of the present invention, the linkages registered by users are utilized by the program code as training data and based on cognitively analyzing the analysis. Returning to FIG. 2, the program code in embodiments of the present invention, can identify various features/attributes (e.g., patterns) in the training data 240, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code can utilize a machine learning algorithm 240 to train the machine learning model 230 (e.g., the algorithms utilized by the program code), including providing weights for the conclusions, so that the program code can prioritize various commonalities between applications, in accordance with the predictor functions that comprise the machine learning model 230. The conclusions can be evaluated by a quality metric 250. Through cognitive analysis, the program code can predict which applications and/or websites users typically link together; and/or 2) predict which activities users typically perform in conjunction with the applications they use.

Returning to FIG. 1, in some embodiments of the present invention, if the program code determines that the user is engaged with the application (130) and/or the user is engaged with a related application or activity through a user interface of the given computing device (140), the program code communicates this engagement status to the application to extend the application session, based on the continued engagement (150). Depending on the existing functionality of the application session that the program code has determined should be extended, the program code can extend the session utilizing different approaches. In some embodiments of the present invention, the application for which the session was initiated is a registered site and with a predefined communication protocol. The program code can communicate with registered sites utilizing a variety of specified protocols, including but not limited to: 1) the program code can electronically communicate with a back-end system of the registered site; and/or 2) the program code can initiate a keystroke and/or click a hidden location, to delay logout (or initiate log out). If the site is not registered with a preference, the program code can be configured to take either approach and/or a separate approach to triggering the application to extend the session. Thus, if the program code determines that the user is engaged with the application, the program code causes the log out of a session of the application to be deferred. If the program code determines that the user is no longer engaged with the application, the program code causes the logout to be initiated.

In some embodiments of the present invention, the program code determines if a user is engaged with a site or product (e.g., application) that is part of a targeted industry section. The program code can automatically target and engage sites specific to offering applications of complex workflows for a consumer or business to utilize. In some embodiments of the present invention, when the program code determines that a user is actively engaged in a workflow with multiple steps and/or a workflow involving complex conditions requiring extra time for the user to gather information to prevent log out before completion, the program code can extend the session in order to accommodate the complexity of the activities of the user. In some embodiments of the present invention, the program code prompts the user to engage and/or engagement is automated based on previous agreement, of the user, with the site, company, and/or product. As such, the user can experience immediate benefits, including but not limited to, increased usability and task completion success rates for complex workflows. Benefits of aspects of the present invention can be experienced in one or more of the insurance, financial, and travel sectors.

Figure 3:
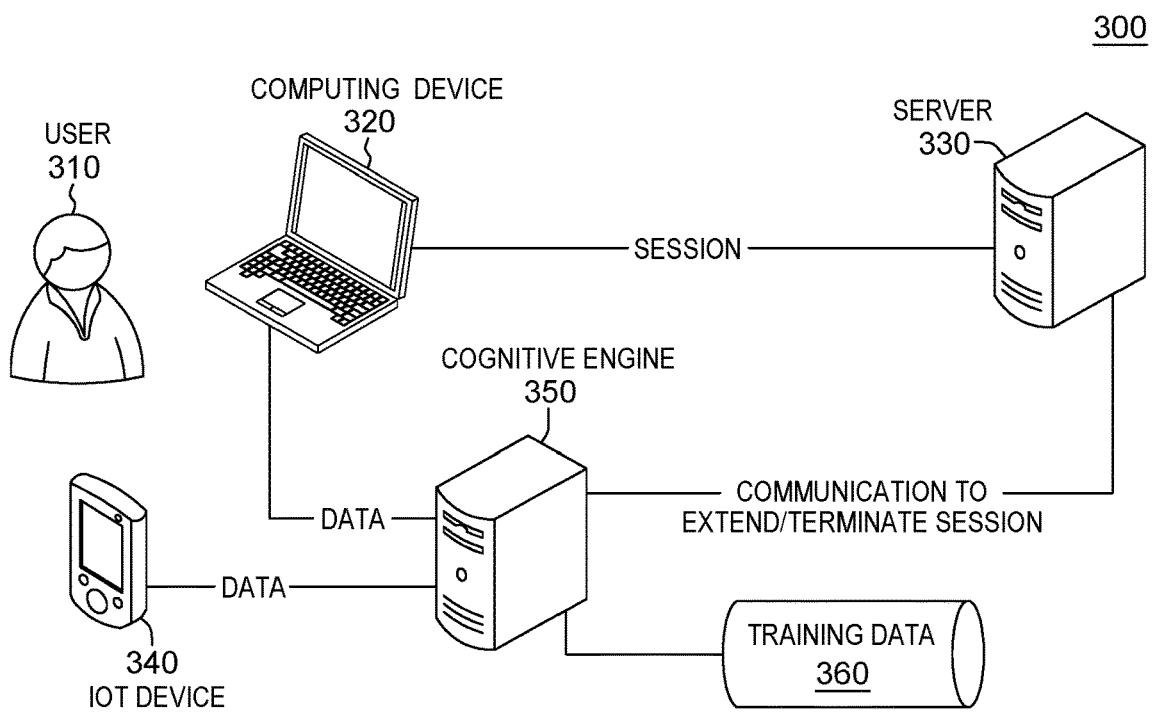
FIG. 3 is a technical environment into which various aspects of some embodiments of the present invention has been implemented.

FIG. 3 is a technical environment 300 into which various aspects of some embodiments of the present invention can be implemented. The technical environment 300 is merely one example of an implementation of certain aspects of some embodiments of the present invention and is provided for illustrative purposes, only. In some embodiments of the present invention, a user 310 utilizes a computing device 320 to initiate a session with an application executed on at least one server 330. Proximate to the user is at least one IoT device 340 which the program code can utilize (e.g., has been given permission to utilize via user registration) to monitor the user. The program code obtains data from the one IoT device 340 and from monitoring user activity on the computing device 320 and cognitively analyzes the data utilizing a cognitive analysis engine 350 (e.g., one or more computing resources executing program code that can perform a cognitive analysis) trained with training data 360. The cognitive analysis engine 350 executes and updates various machine learning algorithms, to determine whether the user's behavior indicates that the user 310 is engaged with the session on the computing device 320. Based on determining that the user 310 is engaged with the session, the program code causes the session to remain pending. Should the program code determine, based on the cognitive analysis, that the user 310 is not engaged, the program code causes the session to terminate and/or does not extend the session, such that it terminates.

Embodiments of the present invention include a computer-implemented method, a computer program product, and a computer system, where program code executing on one or mode processors determines that a user of a given computing device has been authenticated to initiate an application session, that the application session is open, and that the application session has a timeout mechanism triggered by inactivity, where the inactivity comprises the session not receiving a selection, via the given computing device, within a first predefined period of time, through an application session interface, where the application session interface is rendered by the given computing device in a graphical user interface of the given computing device. The program code determines, based on the timeout mechanism, that the application session will automatically timeout within a second predefined period of time based on the inactivity, The program code monitors activities of the user during pendency of the application session with the application, where the activities comprise physical activities of the user and computing activities of the user. Based on the monitoring, the program code determines that at least one activity of the activities indicates engagement of the user with the application session. Based on identifying the at least one activity indicating the engagement, the program code prevents the timeout mechanism from being triggered during a duration of the at least one activity.

In some embodiments of the present invention, the program code monitoring physical activities of the user comprises: the program code identifying one or more computing resources proximate to the user; and the program code utilizing the one or more computing resources to track eye movements of the user to determine if the eye movements indicates a focus by the user on the application session interface, during the inactivity, where the focus comprises the at least one activity indicating the engagement.

In some embodiments of the present invention, at least one computing resource of the one or more computing resources comprises an Internet of Things device.

In some embodiments of the present invention, the program code identifying the one or more resources comprises the program code obtaining a registration, from the user, via the given computing device, of the one or more computing resources.

In some embodiments of the present invention, the program code monitoring physical activities of the user comprises: the program code identifying one or more computing resources proximate to the user; the program code utilizing the one or more computing resources to monitor physical activities of the user comprising movements of the user; and the program code generating a movement profile for the given user, where the movement profile comprises machine learned movement patterns for the given user, based on the monitoring, where the movement profile comprises an engagement measure indicating a probability of a movement pattern of the movement patterns indicating the engagement.

In some embodiments of the present invention, the program code identifies, based on the monitoring by the program code, the user performing a given movement pattern with an engagement measure indicating a probability of above a predefined threshold value that the given movement pattern indicates the engagement.

In some embodiments of the present invention, the given movement pattern comprises the at least one activity.

In some embodiments of the present invention, the one or more computing resources comprise an audio capture device, and the program code monitoring physical activities of the user comprises recording audio of the user during the pendency of the application session.

In some embodiments of the present invention, the program code determining that the at least one activity of the activities indicates the engagement of the user with the application session further comprises: the program code identifying utilizing natural language processing, a context of the recorded audio of the user; the program code analyzing the context and the audio and a context of the application session to determine of the context of the audio and the context of the application are related; and based on determining that the context of the audio and the context of the application are related, the program code identifying the audio as the at least one activity.

In some embodiments of the present invention, the program code monitoring computing activities of the user comprises: the program code monitoring computing activities performed utilizing the given computing device during the pendency of the application session, where the computing activities do not include interacting with the application session.

In some embodiments of the present invention, the program code determining that the at least one activity of the activities indicates the engagement of the user with the application session further comprises: the program code prompting through the graphical user interface of the given computing device, the user to indicate a linkage between each of the computing activity of the computing activities and the application session; and the program code obtaining based on the prompting, an indication that at least one computing activity of the computing activities in linked to the application session; and based on the obtaining, the program code determining that the at least one computing activity of the computing activities is the at least one activity of the activities that indicates the engagement.

In some embodiments of the present invention, the program code retains, in a memory, the linkage indicated by the user.

In some embodiments of the present invention, the one or more processors commence monitoring a given pre-defined period of time prior to an expiration of the second predefined period of time.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing device 320 (FIG. 3), the at least one server 330 (FIG. 3), the IoT device 340 (FIG. 3), and/or the cognitive engine 350 (FIG. 3), can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 4, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
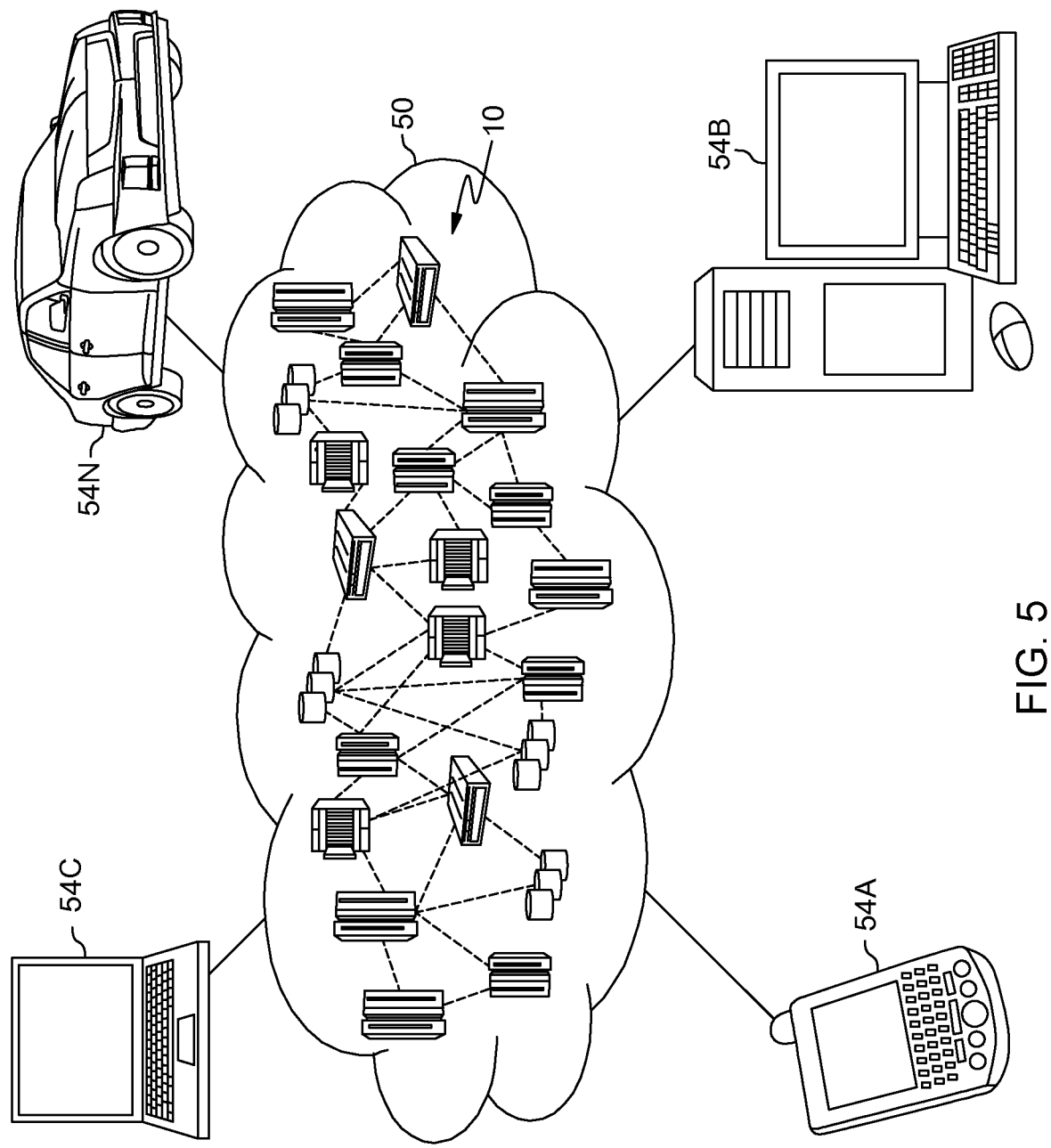
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
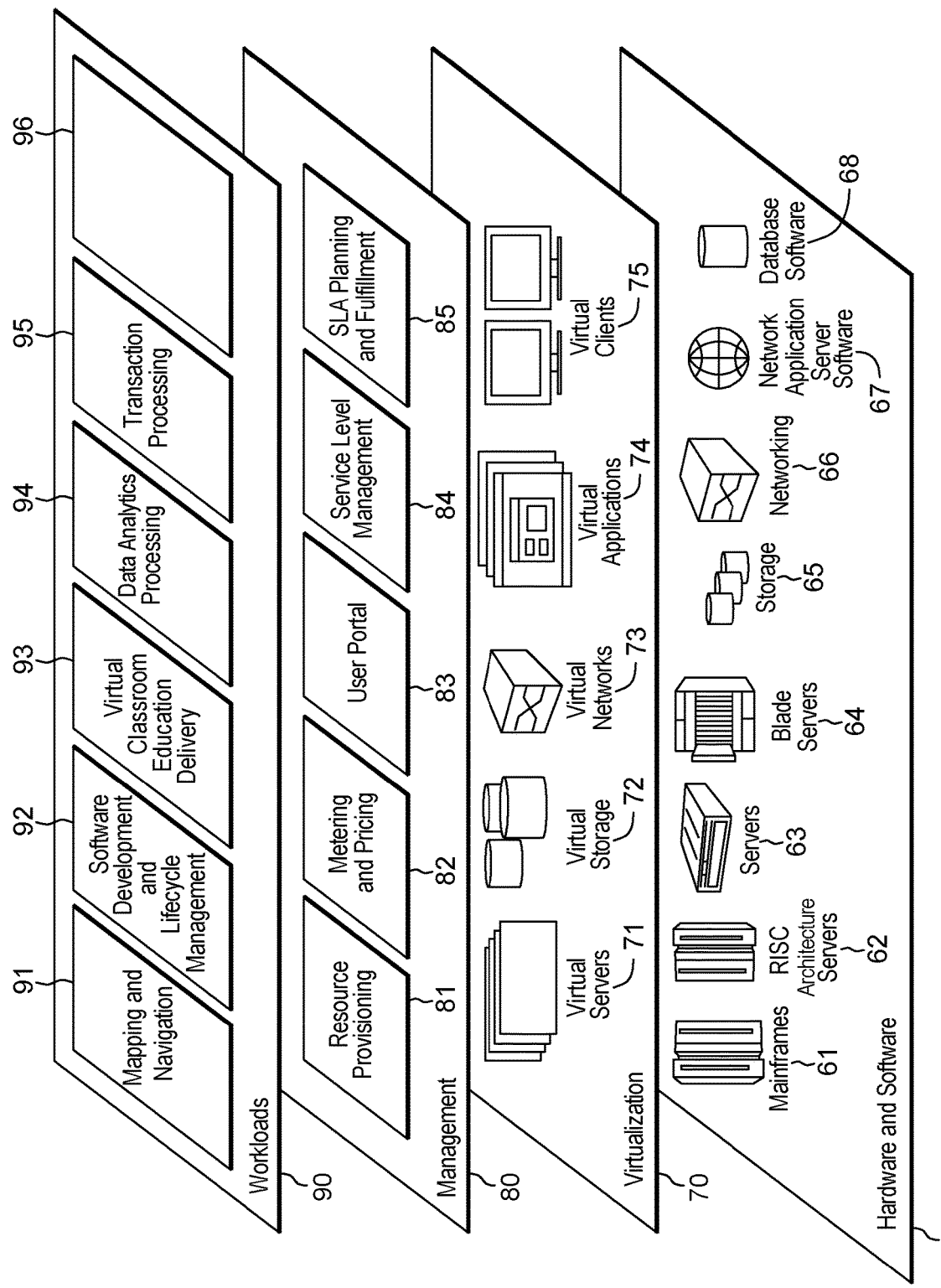
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; maintaining session continuity during periods of inactivity within the session 96.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   determining, by one or more processors, that a user of a given computing device has been authenticated to initiate an application session, that the application session is open, and that the application session has a timeout mechanism triggered by inactivity, wherein the inactivity comprises the session not receiving a selection, via the given computing device, within a first predefined period of time, through an application session interface, wherein the application session interface is rendered by the given computing device in a graphical user interface of the given computing device;
   determining, by the one or more processors, based on the timeout mechanism, that the application session will automatically timeout within a second predefined period of time based on the inactivity;
   monitoring, by the one or more processors, activities of the user during pendency of the application session with the application, wherein the activities comprise physical activities of the user and computing activities of the user, wherein monitoring the physical activities of the user comprises:
      identifying, by the one or more processors, one or more computing resources proximate to the user;
      utilizing, by the one or more processors, the one or more computing resources to monitor physical activities of the user comprising movements of the user; and
      generating, by the one or more processors, a movement profile for the given user, wherein the movement profile comprises machine learned movement patterns for the given user, based on the monitoring, wherein the movement profile comprises an engagement measure indicating a probability of a movement pattern of the movement patterns indicating the engagement;
   based on the monitoring, determining, by the one or more processors, that at least one activity of the activities indicates engagement of the user with the application session; and
   based on identifying the at least one activity indicating the engagement, preventing, by the one or more processors, the timeout mechanism from being triggered during a duration of the at least one activity.

2. The computer-implemented method of claim 1, wherein monitoring the physical activities of the user further comprises:
   utilizing, by the one or more processors, the one or more computing resources to track eye movements of the user to determine if the eye movements indicate a focus by the user on the application session interface, during the inactivity, wherein the focus comprises the at least one activity indicating the engagement.

3. The computer-implemented method of claim 2, wherein at least one computing resource of the one or more computing resources comprises an Internet of Things device.

4. The computer-implemented method of claim 3, wherein identifying the one or more resources comprises obtaining, by the one or more processors, a registration, from the user, via the given computing device, of the one or more computing resources.

5. The computer-implemented method of claim 1, further comprising:
   identifying, based on the monitoring, the user performing a given movement pattern with an engagement measure indicating a probability of above a predefined threshold value that the given movement pattern indicates the engagement.

6. The computer-implemented method of claim 5, wherein the given movement pattern comprises the at least one activity.

7. The computer-implemented method of claim 1, wherein the one or more computing resources comprise an audio capture device, and wherein monitoring the physical activities of the user comprises recording audio of the user during the pendency of the application session.

8. The computer-implemented method of claim 7, wherein determining that the at least one activity of the activities indicates the engagement of the user with the application session further comprises:
   identifying, by the one or more processors, utilizing natural language processing, a context of the recorded audio of the user;
   cognitively analyzing, by the one or more processors, the context and the audio and a context of the application session to determine of the context of the audio and the context of the application are related; and
   based on determining that the context of the audio and the context of the application are related, identifying, by the one or more processors, the audio as the at least one activity.

9. The computer-implemented method of claim 1, wherein monitoring computing activities of the user comprises:
   monitoring, by the one or more processors, computing activities performed utilizing the given computing device during the pendency of the application session, wherein the computing activities do not include interacting with the application session.

10. The computer-implemented method of claim 9, wherein determining that the at least one activity of the activities indicates the engagement of the user with the application session further comprises:
    prompting, by the one or more processors, through the graphical user interface of the given computing device, the user to indicate a linkage between each of the computing activity of the computing activities and the application session; and obtaining, by the one or more processors, based on the prompting, an indication that at least one computing activity of the computing activities in linked to the application session; and based on the obtaining, determining that the at least one computing activity of the computing activities is the at least one activity of the activities that indicates the engagement.

11. The computer-implemented method of claim 10, further comprising:

retaining, by the one or more processors, in a memory, the linkage indicated by the user.

12. The computer-implemented method of claim 11, wherein the one or more processors commence monitoring a given pre-defined period of time prior to an expiration of the second predefined period of time.

13. A computer program product comprising:

a computer readable storage medium readable by one or more processors and storing instructions for execution by the one or more processors for performing a method comprising:

determining, by the one or more processors, that a user of a given computing device has been authenticated to initiate an application session, that the application session is open, and that the application session has a timeout mechanism triggered by inactivity, wherein the inactivity comprises the session not receiving a selection, via the given computing device, within a first predefined period of time, through an application session interface, wherein the application session interface is rendered by the given computing device in a graphical user interface of the given computing device;

determining, by the one or more processors, based on the timeout mechanism, that the application session will automatically timeout within a second pre-defined period of time based on the inactivity;

monitoring, by the one or more processors, activities of the user during pendency of the application session with the application, wherein the activities comprise physical activities of the user and computing activities of the user, wherein monitoring the physical activities of the user comprises:

identifying, by the one or more processors, one or more computing resources proximate to the user;

utilizing, by the one or more processors, the one or more computing resources to monitor physical activities of the user comprising movements of the user; and generating, by the one or more processors, a movement profile for the given user, wherein the movement profile comprises machine learned movement patterns for the given user, based on the monitoring, wherein the movement profile comprises an engagement measure indicating a probability of a movement pattern of the movement patterns indicating the engagement;

based on the monitoring, determining, by the one or more processors, that at least one activity of the activities indicates engagement of the user with the application session; and based on identifying the at least one activity indicating the engagement, preventing, by the one or more processors, the timeout mechanism from being triggered during a duration of the at least one activity.

14. The computer program product of claim 13, wherein monitoring physical activities of the user comprises:

utilizing, by the one or more processors, the one or more computing resources to track eye movements of the user to determine if the eye movements indicate a focus by the user on the application session interface, during the inactivity, wherein the focus comprises the at least one activity indicating the engagement.

15. The computer program product of claim 14, wherein at least one computing resource of the one or more computing resources comprises an Internet of Things device.

16. The computer program product of claim 15, wherein identifying the one or more resources comprises obtaining, by the one or more processors, a registration, from the user, via the given computing device, of the one or more computing resources.

17. The computer program product of claim 13, further comprising:

identifying, based on the monitoring, the user performing a given movement pattern with an engagement measure indicating a probability of above a predefined threshold value that the given movement pattern indicates the engagement, wherein the given movement pattern comprises the at least one activity.

18. A system comprising:

a memory;

one or more processors in communication with the memory;

program instructions executable by the one or more processors via the memory to perform a method, the method comprising:

determining, by the one or more processors, that a user of a given computing device has been authenticated to initiate an application session, that the application session is open, and that the application session has a timeout mechanism triggered by inactivity, wherein the inactivity comprises the session not receiving a selection, via the given computing device, within a first predefined period of time, through an application session interface, wherein the application session interface is rendered by the given computing device in a graphical user interface of the given computing device;

determining, by the one or more processors, based on the timeout mechanism, that the application session will automatically timeout within a second pre-defined period of time based on the inactivity;

monitoring, by the one or more processors, activities of the user during pendency of the application session with the application, wherein the activities comprise physical activities of the user and computing activities of the user, wherein monitoring the physical activities of the user comprises:

identifying, by the one or more processors, one or more computing resources proximate to the user;

utilizing, by the one or more processors, the one or more computing resources to monitor physical activities of the user comprising movements of the user; and generating, by the one or more processors, a movement profile for the given user, wherein the movement profile comprises machine learned movement patterns for the given user, based on the monitoring, wherein the movement profile comprises an engagement measure indicating a probability of a movement pattern of the movement patterns indicating the engagement;

based on the monitoring, determining, by the one or more processors, that at least one activity of the activities indicates engagement of the user with the application session; and based on identifying the at least one activity indicating the engagement, preventing, by the one or more processors, the timeout mechanism from being triggered during a duration of the at least one activity.

* * * * *